United States Patent
Yang et al.

(10) Patent No.: US 8,501,344 B2
(45) Date of Patent: Aug. 6, 2013

(54) BATTERY MODULE OF COMPACT JOINT STRUCTURE

(75) Inventors: Jae Hun Yang, Daejeon (KR); Heekook Yang, Daejeon (KR); Jongmoon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 810 days.

(21) Appl. No.: 12/445,670

(22) PCT Filed: Oct. 9, 2007

(86) PCT No.: PCT/KR2007/004917
§ 371 (c)(1),
(2), (4) Date: Mar. 19, 2010

(87) PCT Pub. No.: WO2008/048013
PCT Pub. Date: Apr. 24, 2008

(65) Prior Publication Data
US 2010/0190048 A1 Jul. 29, 2010

(30) Foreign Application Priority Data

Oct. 16, 2006 (KR) .................. 10-2006-0100098

(51) Int. Cl.
*H01M 2/08* (2006.01)
*H01M 2/10* (2006.01)
*H01M 2/00* (2006.01)
*H01M 2/04* (2006.01)

(52) U.S. Cl.
USPC ........... 429/175; 429/100; 429/163; 429/172; 429/176; 429/185

(58) Field of Classification Search
USPC .................. 429/175, 176, 163, 172, 185, 100
See application file for complete search history.

(56) References Cited

U.S. PATENT DOCUMENTS 7,829,216 B2 * 11/2010 Han et al. ............. 429/162

FOREIGN PATENT DOCUMENTS

| JP | 6-263057 A | 9/1994 |
| JP | 2000-85375 A | 3/2000 |

(Continued)

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed herein is a battery module including a charge and discharge stack, constituted by a plurality of secondary battery cells that can be charged and discharged or a plurality of unit modules having the secondary battery cells, mounted between an upper module case and a lower module case, wherein the lower module case is provided with joint structures including coupling parts (upper and lower coupling parts) for allowing both upward and downward couplings, and the upper module case is provided with joint holes communicating with the upper coupling parts of the joint structures. The battery module according to the present invention has the effect of reinforcing the low mechanical strength of the battery cells while the weight and size of the battery module is minimized. Also, the battery module according to the present invention is mounted to an inner frame of a vehicle or an additional frame fixed in the vehicle by a simple joint structure without using a plurality of members for a mechanical joint, whereby the manufacturing costs of the battery module are generally decreased. Furthermore, the battery module according to the present invention is safely protected when vibrations are generated from the vehicle during the driving of the vehicle. In addition, it is possible to easily manufacture a middle- or large-sized battery system having desired power and capacity using the battery module as a unit body.

13 Claims, 3 Drawing Sheets

FOREIGN PATENT DOCUMENTS

| | | |
|---|---|---|
| JP | 2002-127761 A | 5/2002 |
| JP | 2004-31243 A | 1/2004 |
| JP | 9-219181 A | 8/2007 |
| KR | 1020000070071 A | 11/2000 |

* cited by examiner

BATTERY MODULE OF COMPACT JOINT STRUCTURE

FIELD OF THE INVENTION

The present invention relates to a battery module, and, more particularly, to a battery module including a charge and discharge stack, constituted by a plurality of secondary battery cells that can be charged and discharged or a plurality of unit modules having the secondary battery cells, mounted between an upper module case and a lower module case, wherein the lower module case is provided with joint structures including coupling parts (upper and lower coupling parts) for allowing both upward and downward couplings, and the upper module case is provided with joint holes communicating with the upper coupling parts of the joint structures.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small and the manufacturing costs of the pouch-shaped battery are low.

However, when a middle- or large-sized battery module is constructed using a plurality of battery cells or a plurality of unit modules each of which includes a predetermined number of battery cells, a plurality of members are generally needed to mount the battery cells or the unit modules in a middle- or large-sized battery module case and to mechanically couple the middle- or large-sized battery module case to a mounting member, such as a body frame, of a vehicle, and, as a result, a process for assembling the members is very complicated. Furthermore, there is needed a space for coupling the members, with the result that the total size of the system is increased. The increase in size of the system is not preferred in the above-described aspect. Consequently, there is a high necessity for a middle- or large-sized battery module having a joint structure that is more compact and structurally stable.

In this connection, there are disclosed some technologies on a joint structure of a middle- or large-sized battery module mounting frame for mounting a middle- or large-sized battery module, having unit modules mounted therein, to a predetermined region of a vehicle.

For example, Japanese Patent Registration No. 3324182 discloses a joint structure of a battery mounting frame wherein bolts, inserted from the bottom of a floor panel of a vehicle, joined to guide tubes and nut plates such that a lattice-shaped battery frame, in which a plurality of batteries are received, is mounted at the bottom of the floor panel of the vehicle.

However, the above-described technology has a problem in that the joint structure is formed only at one side of the battery frame, with the result that the batteries are spaced apart from the battery frame, and therefore, when impacts, such as vibrations, are applied to joint structure from the vehicle, the joint structure is not structurally stable. Also, the above-described technology has a problem in that the joint structure includes a plurality of joint members, with the result that the manufacturing costs are increased, and the assembly process to mount the battery frame to the floor panel of the vehicle is not easily performed.

SUMMARY OF THE INVENTION

Therefore, the present invention has been made to solve the above problems, and other technical problems that have yet to be resolved.

Specifically, it is an object of the present invention to provide a battery module that can be easily and stably mounted to a predetermined position of a vehicle, such that the structure of the joint structure of the battery module is not exposed to the outside, whereby the coupling of the battery module to the vehicle is easily and stably accomplished.

It is another object of the present invention to provide a battery module that is manufactured by a simple assembly process without using a plurality of members for a mechanical joint, whereby the manufacturing costs of the battery module are lowered, and that is effectively prevented from being damaged during the manufacture or the operation of the battery module.

In accordance with one aspect of the present invention, the above and other objects can be accomplished by the provision of a battery module including a charge and discharge stack, constituted by a plurality of secondary battery cells that can be charged and discharged or a plurality of unit modules having the secondary battery cells, mounted between an upper module case and a lower module case, wherein the lower module case is provided with joint structures including coupling parts (upper and lower coupling parts) for allowing both upward and downward couplings, and the upper module case is provided with joint holes communicating with the upper coupling parts of the joint structures.

The battery module is constructed in a structure in which the battery cells or the unit modules are mounted on the lower module case, and the upper module case is coupled to the lower module case such that the battery cells or the unit modules are covered by the upper module case. As a result, the joint between the upper module case and the lower module case and the joint of the battery module to a predetermined region are simultaneously carried out at the same joint structure. Consequently, the total size of the battery module is decreased, and the battery module is easily located adjacent to another battery module, as compared to a conventional joint structure which protrudes from a battery module case, whereby the battery module has a more compact and stable structure.

In the battery module according to the present invention, the upper and lower coupling parts may be constructed in various structures. For example, the upper and lower coupling parts may be constructed in a female screw structure, and the upper and lower module cases may be coupled to each other by threadedly inserting male screw type joint members into the upper coupling parts of the joint structures through the joint holes of the upper module case. These joint structures guarantee more secure coupling between the upper module case and the lower module case.

As a specific example, the joint structures may be insert nuts formed such that the upper and lower coupling parts are constructed in a female screw structure. The male screw type joint members may be threadedly inserted into upper coupling parts of the insert nuts through the joint holes of the upper module case from above, whereby the coupling between the upper module case and the lower module case is accomplished. Also, male screw type joint members may be threadedly inserted into lower coupling parts of the insert nuts through a predetermined region (for example, a mounting member), whereby the coupling of the battery module to the mounting member is accomplished.

The insert nuts may be mounted to the predetermined region in various manners. For example, the insert nuts may be molded simultaneously when molding the lower module case. Alternatively, the lower module case may be provided with mounting through-holes, and the insert nuts may be inserted into the mounting through-holes.

In a preferred embodiment, the insert nuts are constructed in a structure in which the upper end of each insert nut has a relatively large diameter. Consequently, the separation of the insert nuts from the lower battery module is prevented, even when an external force, such as vibrations generated from a vehicle, is applied to the battery module in the lateral direction.

According to circumstances, the insert nuts may be constructed in a structure in which the upper end of each insert nut is depressed from the top of the lower module case. Preferably, the upper module case has regions corresponding to the depressed structures of the lower module case, and each region of the upper module case is constructed in a protruding structure. This structure increases the coupling force between the upper module case and the lower module case, and further increased the coupling stability against an external force applied to the battery module in the lateral direction. Also, the depression-protruding structure assists the coupling position between the upper module case and the lower module case to be easily established during the assembly process.

The insert nuts are not particularly restricted so long as the insert nuts are made of a material having a predetermined strength. For example, the insert nuts may be made of a metal material, a high-strength plastic resin, or a plastic composite. The insert nuts, made of the above-specified material, exhibit a high strength, and therefore, the rupture or breakage of the insert nuts are prevented when external impacts are applied to the battery module.

The joint structures, by which the upper module case and the lower module case are coupled to each other, may be formed in various positions based upon the design structure of the module case. Preferably, however, the joint structures are mounted adjacent to the outer corners of the lower module case because the structural stability is increased when the joint structures are mounted adjacent to the corners of the lower module case. When the battery module is formed approximately in the shape of a rectangular parallelepiped, for example, the joint structures are mounted at four corners of the module case, with the result that the unit module stack, mounted in the module case, is stably protected, and the joint strength between the battery module and the mounting member is further increased.

According to circumstances, the contact interface between the upper module case and the lower module case may be constructed in a step-shaped structure, by which the upper module case and the lower module case are engaged with each other. Consequently, a possibility of the separation between the upper module case and the lower module case is reduced, even when an external force is applied to the battery module in the lateral direction, and therefore, the coupling between the upper module case and the lower module case is further improved. This step-shaped structure provides an effect similar to that provided by the previously described depression-protruding structure.

In accordance with another aspect of the present invention, there is provided a middle- or large-sized battery system, having high power and large capacity, constructed in a structure in which a plurality of such battery modules are mounted on a predetermined member ('mounting member').

The mounting member is provided at positions corresponding to the lower coupling parts of the joint structures of the battery module with joint through-holes, whereby the coupling of the battery module to the mounting member is accomplished by insertion of joint members through the through-holes from the bottom.

Specifically, the mounting member is provided at the positions corresponding to the lower coupling parts of the lower module case with through-holes, through which joint members, such as male screws, are threadedly inserted such that the battery module is joined to a predetermined position. The joint members are threadedly inserted into the lower ends of the insert nuts of the lower coupling parts, which are constructed in a female screw structure, whereby the coupling between the battery module and the mounting member is stably accomplished.

The mounting member is not particularly restricted so long as the mounting member is a device in which the battery module is needed to be mounted. Preferably, the mounting member is an inner frame of a vehicle or an additional frame fixed to the inner frame of the vehicle.

The middle- or large-sized battery system according to the present invention may be manufactured by combining the battery modules based on a desired power and capacity. The middle- or large-sized battery system is previously used in electric vehicles, hybrid electric vehicles, electric motorcycles, or electric bicycles, which have a limited installation space and are exposed to frequent vibrations and strong impacts, in consideration of the installation efficiency and structural stability of the battery system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
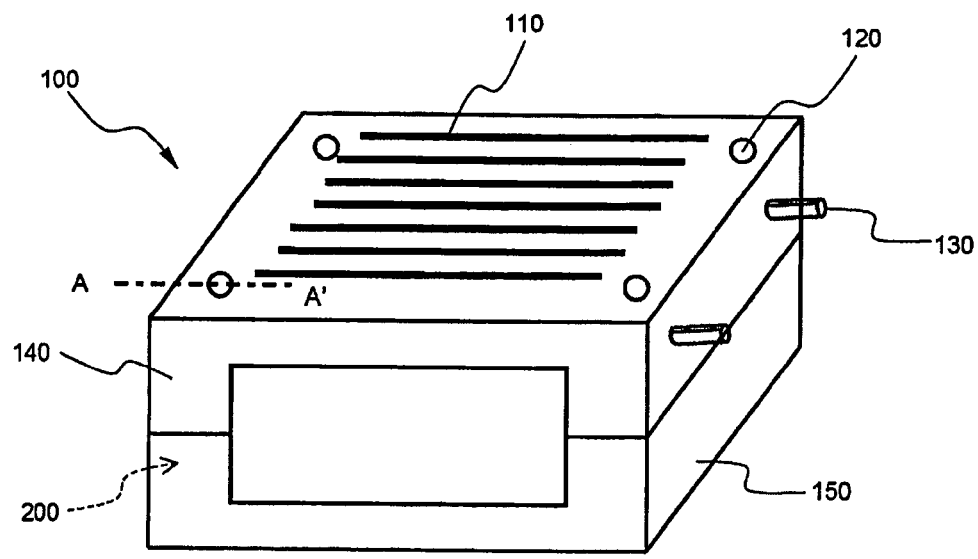
FIG. 1 is a perspective view illustrating a battery module according to a preferred embodiment of the present invention.
Figure 2:
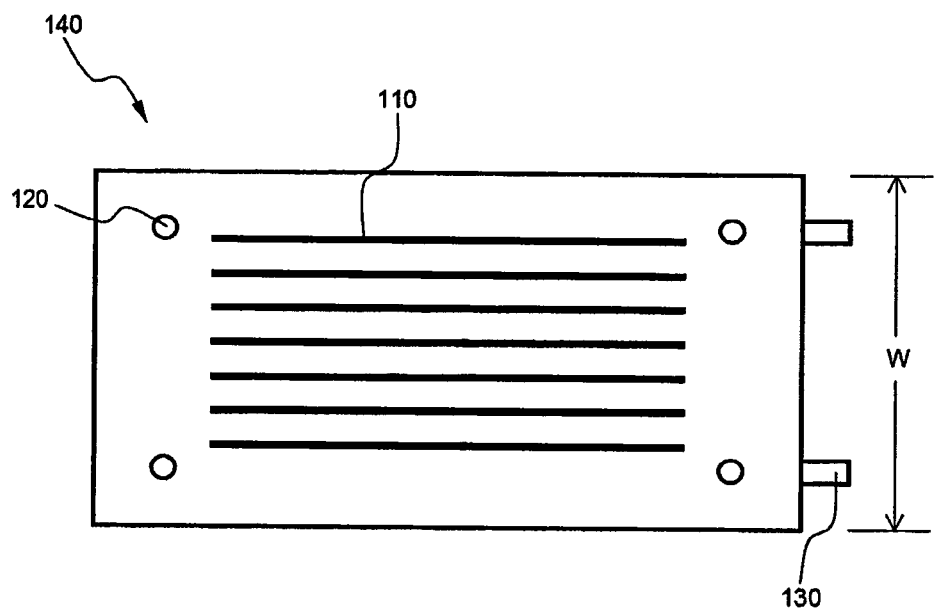
FIGS. 2 to 4 are a plan view, a front view, and a bottom view of FIG. 1, respectively.
Figure 3:
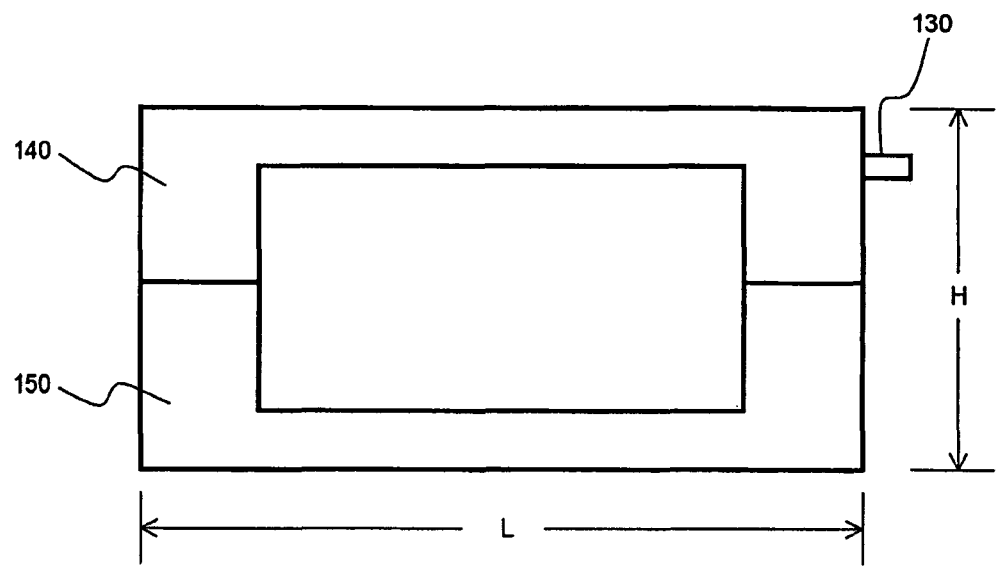
Figure 4:
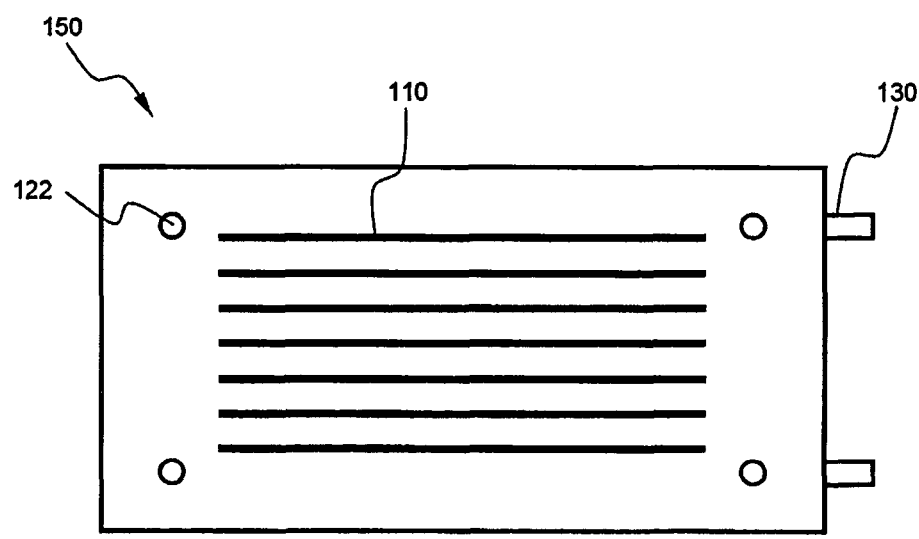

FIG. 1 is a perspective view typically illustrating a battery module according to a preferred embodiment of the present invention, and FIGS. 2 to 4 are a plan view, a front view, and a bottom view typically illustrating the battery module, respectively.

Referring to these drawings, the battery module 100 includes a plurality of battery cells or unit modules 200, an upper module case 140 and a lower module case 150, between which the battery cells or the unit modules 200 are mounted, and upper joint though-holes 120 and lower joint through-holes 122.

Electrode terminals 130 protrude from one side of the upper module case 140. The upper module case 140 is provided at the top thereof with a plurality of slits 110, which extend in the longitudinal direction of the unit modules 200, which are mounted inside the upper module case 140. The lower module case 150 is also provided at the bottom thereof with a plurality of slits 110 identical to those of the upper module case 140. Heat generated during the charge and discharge of the battery modules 200 is appropriately removed by a coolant introduced into the upper module case 140 and the lower module case 150 through the slits 110.

The assembly process of the battery module 100 is as follows. First, the unit modules 200 are mounted on the lower module case 140, and then the upper module case 140 is connected to the lower module case 140. Subsequently, as shown in FIG. 5, male screw type joint members 160 are threadedly inserted into upper coupling parts of the lower module case 150 through the upper joint through-holes 120 from above.

The battery module 100 has a volume represented by the product of the length (L), the width (W), and the height (H) of the battery module 100. When the battery module 100 according to the present invention is mounted to a vehicle as shown in FIG. 5, the battery module 100 exhibits a compact and stable structure.

Figure 5:
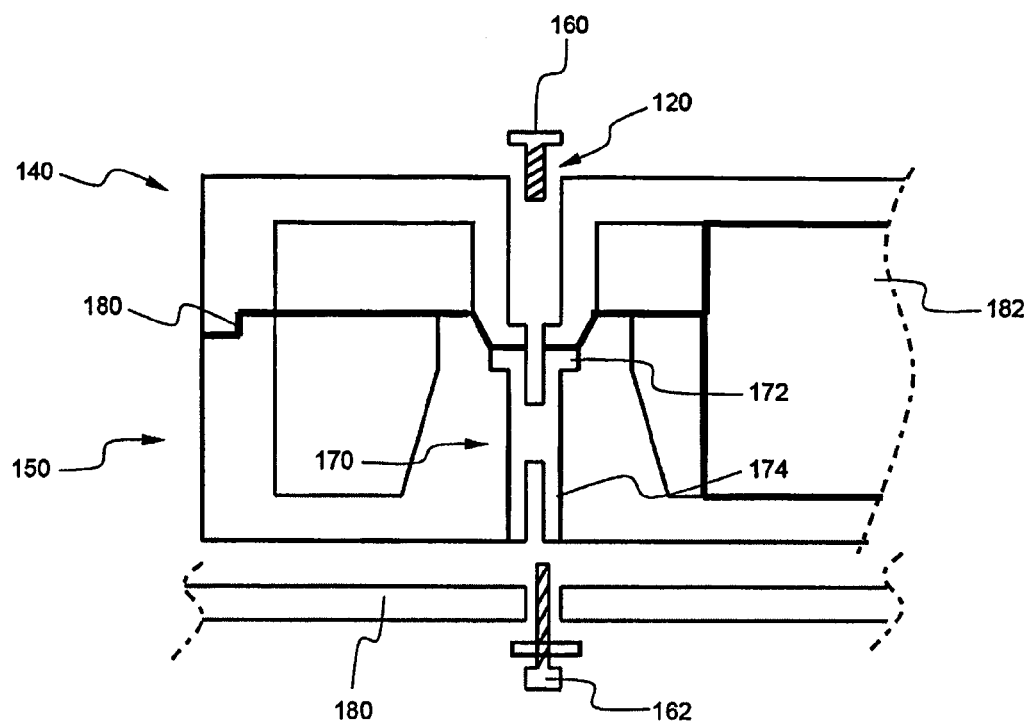
FIG. 5 is a sectional view taken along line A-A', enlargedly illustrating a joint structure of FIG. 1.

FIG. 5 is an enlarged sectional view taken along line A-A' of FIG. 1, typically illustrating the joint structure of the battery module according to the present invention.

Referring to FIG. 5, insert nuts 170 are mounted adjacent to the corners of the lower module case 150, while the unit modules are mounted between the battery module cases 140 and 150 according to the mounting process as described above, and the male screw type joint members 160 are threadedly inserted into the upper coupling parts 172 of the insert nuts 170, which are constructed in a female screw structure, from above the upper module case, whereby the battery module 100 as shown in FIG. 1 is manufactured.

After the battery module 100 as shown in FIG. 1 is manufactured through the above-described process, male screw type joint members 162 are threadedly inserted into lower coupling parts 174 of the insert nuts 170, which are constructed in a female screw structure, through a mounting member 180, such as an inner frame, of the vehicle. Consequently, an additional space is not necessary to mount the battery module 100 on the mounting member 180, excluding the bottom area defined by the width (W) and the length (L) of the battery module 100. Also, the mounted state of the battery module is stably maintained, even when vibrations or impacts are applied to the battery module.

Structurally, the upper coupling part 172 of each insert nut 170 is constructed in a structure in which the upper end of the upper coupling part 172 has an outer diameter greater than that of the lower end of the upper coupling part 172, and the upper coupling part 172 of each insert nut 170 is depressed from the top of the lower module case 150. Also, the upper module case 140 has regions corresponding to the depressed structures of the lower module case 150. Each region of the upper module case 140 is constructed in a protruding structure.

In addition, the contact interface between the upper module case 140 and the lower module case 150 is constructed in a step-shaped structure 180, by which the upper module case 140 and the lower module case 150 are engaged with each other.

Consequently, the disengagement and separation between the upper module case 140 and the lower module case 150 is prevented, even when an external force is applied to the battery module in the lateral direction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention has the effect of reinforcing the low mechanical strength of the battery cells while the weight and size of the battery module is minimized. Also, the battery module according to the present invention is mounted to an inner frame of a vehicle or an additional frame fixed in the vehicle by a simple joint structure without using a plurality of members for a mechanical joint, whereby the manufacturing costs of the battery module are generally decreased. Furthermore, the battery module according to the present invention is safely protected when vibrations are generated from the vehicle during the driving of the vehicle. In addition, it is possible to easily manufacture a middle- or large-sized battery system having a desired power and capacity using the battery module as a unit body.

What is claimed is:

1. A battery module including a charge and discharge stack, constituted by a plurality of secondary battery cells that can be charged and discharged or a plurality of unit modules having the secondary battery cells, mounted between an upper module case and a lower module case, wherein
    the lower module case is provided with joint structures including coupling parts (upper and lower coupling parts) for allowing both upward and downward couplings,
    the upper module case is provided with joint holes communicating with the upper coupling parts of the joint structures,
    the upper and lower coupling parts are constructed in a female screw structure, and
    the upper and lower module cases are coupled to each other by threadedly inserting male screw type joint members into the upper coupling parts of the joint structures through the joint holes of the upper module case.

2. The battery module according to claim 1, wherein the joint structures are insert nuts formed such that the upper and lower coupling parts are constructed in a female screw structure.

3. The battery module according to claim 2, wherein
    the insert nuts are molded simultaneously when molding the lower module case, or
    the lower module case is provided with mounting through-holes, and the insert nuts are inserted into the mounting through-holes.

4. The battery module according to claim 2, wherein the insert nuts are constructed in a structure in which the upper end of each insert nut has an outer diameter greater than that of the lower end of the insert nut.

5. The battery module according to claim 4, wherein the insert nuts are constructed in a structure in which the upper end of each insert nut is depressed from the top of the lower module case.

6. The battery module according to claim 5, wherein the upper module case has regions corresponding to the depressed structures of the lower module case, each region of the upper module case being constructed in a protruding structure.

7. The battery module according to claim 2, wherein the insert nuts are made of a metal material, a plastic resin, or a plastic composite.

8. The battery module according to claim 1, wherein the joint structures are mounted adjacent to corners of the lower module case.

9. The battery module according to claim 1, wherein a contact interface between the upper module case and the lower module case is constructed in a step-shaped structure, by which the upper module case and the lower module case are engaged with each other.

10. A battery system constructed in a structure in which at least one battery module, according to claim 1, is mounted on a predetermined member ('mounting member').

11. The battery system according to claim 10, wherein the mounting member is provided at positions corresponding to the lower coupling parts of the joint structures of the battery module with joint through-holes, whereby the coupling of the battery module to the mounting member is accomplished by insertion of joint members through the through-holes from the bottom.

12. The battery system according to claim 11, wherein the mounting member is an inner frame of a vehicle or an additional frame fixed to the inner frame of the vehicle.

13. An electric or hybrid electric vehicle including the battery system according to claim 10.

* * * * *